(12) United States Patent
Sandu et al.

(10) Patent No.: US 12,385,858 B2
(45) Date of Patent: *Aug. 12, 2025

(54) EVALUATING SOURCE ROCK BASED ON TIME SERIES ANALYSIS

(71) Applicant: Saudi Arabian Oil Company, Dhahran (SA)

(72) Inventors: Constantin Sandu, Houston, TX (US); Shannon L. Eichmann, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 265 days.

This patent is subject to a terminal disclaimer.

(21) Appl. No.: 18/120,291

(22) Filed: Mar. 10, 2023

(65) Prior Publication Data

US 2024/0302297 A1    Sep. 12, 2024

(51) Int. Cl.
*G01N 23/046*    (2018.01)
*G01N 15/08*    (2006.01)

(52) U.S. Cl.
CPC ....... *G01N 23/046* (2013.01); *G01N 15/0806* (2013.01); *G01N 2015/0846* (2013.01)

(58) Field of Classification Search
CPC ............. G01N 23/046; G01N 15/0806; G01N 2015/0846; G01N 15/0826; G01N 15/088; G01N 15/1433; G01N 15/1468
See application file for complete search history.

(56) References Cited

U.S. PATENT DOCUMENTS

| | | |
|---|---|---|
| 3,834,122 A | 9/1974 | Allison et al. |
| 4,344,917 A | 8/1982 | Schorno |
| 4,485,071 A | 11/1984 | Larter |
| 4,842,825 A | 6/1989 | Martin |
| 4,882,128 A | 11/1989 | Hukvari et al. |
| 5,180,556 A | 1/1993 | Nolte et al. |

(Continued)

FOREIGN PATENT DOCUMENTS

| | | |
|---|---|---|
| AU | 2012359291 | 7/2013 |
| AU | 2021250869 | 7/2022 |

(Continued)

OTHER PUBLICATIONS

Alhammadi et al., "Pore-scale Imaging and Characterization of Hydrocarbon Reservoir Rock Wettability at Subsurface Conditions Using X-ray Microtomography," Journal of Visualized Experiments, Oct. 21, 2018, 140:1-15, 15 pages.

(Continued)

*Primary Examiner* — Courtney D Thomas
(74) *Attorney, Agent, or Firm* — Fish & Richardson P.C.

(57) ABSTRACT

Systems and methods for evaluating source rock include: a reactor vessel comprising a body with an internal cavity sized to receive a sample holder, a heating system, a radiation source and a detector bracketing the reactor vessel, wherein the radiation source, the detector, and the reactor vessel are rotatable relative to each other; and a processor in communication with the detector, the processor causing performance of operations comprising: obtaining a plurality of measurements of a source rock sample; generating a conceptual model of the source rock sample based on the plurality of measurements obtained; and determining one or more properties of the source rock sample based on the conceptual model.

16 Claims, 12 Drawing Sheets

(56) References Cited

U.S. PATENT DOCUMENTS

| | | |
|---|---|---|
| 5,390,529 A | 2/1995 | Ghiselli |
| 5,441,343 A | 8/1995 | Pylkki et al. |
| 6,095,679 A | 8/2000 | Hammiche et al. |
| 6,491,425 B1 | 12/2002 | Hammiche et al. |
| 6,590,647 B2 | 7/2003 | Stephenson |
| 7,078,237 B1 | 7/2006 | Mowry |
| 7,086,484 B2 | 8/2006 | Smith |
| 7,588,827 B2 | 9/2009 | Nie et al. |
| 7,879,625 B1 | 2/2011 | Boss |
| 8,177,422 B2 | 5/2012 | Kjoller et al. |
| 8,337,783 B2 | 12/2012 | Locascio et al. |
| 8,818,778 B2 | 8/2014 | Salazar-Tio et al. |
| 8,821,806 B2 | 9/2014 | Hersherwitz et al. |
| 9,128,210 B2 | 9/2015 | Pomerantz |
| 9,507,047 B1 | 11/2016 | Dvorkin et al. |
| 9,696,270 B1 | 7/2017 | Roy et al. |
| 10,043,274 B2 | 8/2018 | Varslot et al. |
| 10,611,967 B2 | 4/2020 | Inan |
| 11,352,879 B2 | 6/2022 | Li et al. |
| 2008/0110253 A1 | 5/2008 | Stephenson et al. |
| 2008/0111064 A1 | 5/2008 | Andrews et al. |
| 2009/0187391 A1 | 7/2009 | Wendt et al. |
| 2010/0092865 A1 | 4/2010 | Kanno et al. |
| 2010/0224823 A1 | 9/2010 | Yin et al. |
| 2011/0207231 A1 | 8/2011 | Natan et al. |
| 2011/0260051 A1 | 10/2011 | Preudhomme et al. |
| 2011/0275061 A1 | 11/2011 | Weidemaier et al. |
| 2012/0026037 A1 | 2/2012 | Thomson et al. |
| 2012/0257199 A1 | 10/2012 | Liu et al. |
| 2012/0273193 A1 | 11/2012 | Sen |
| 2012/0281883 A1 | 11/2012 | Hurley et al. |
| 2013/0040292 A1 | 2/2013 | Lopez et al. |
| 2013/0084643 A1 | 4/2013 | Commarieu et al. |
| 2013/0259190 A1 | 10/2013 | Walls et al. |
| 2013/0259808 A1 | 10/2013 | Chen et al. |
| 2014/0048694 A1 | 2/2014 | Pomerantz |
| 2014/0077121 A1 | 3/2014 | Sun et al. |
| 2014/0186939 A1 | 7/2014 | Peterman et al. |
| 2014/0360973 A1 | 12/2014 | Yin et al. |
| 2015/0038347 A1 | 2/2015 | Johnson et al. |
| 2015/0079270 A1 | 3/2015 | Wang et al. |
| 2015/0168588 A1 | 6/2015 | Vinegar et al. |
| 2016/0341707 A1 | 11/2016 | Inan |
| 2017/0059497 A1 | 3/2017 | Seltzer |
| 2017/0336528 A1 | 11/2017 | Badri et al. |
| 2018/0134964 A1 | 5/2018 | Inan |
| 2019/0118265 A1 | 4/2019 | Nie et al. |
| 2021/0080413 A1 | 3/2021 | Eichmann et al. |
| 2021/0080414 A1 | 3/2021 | Eichmann et al. |
| 2022/0205880 A1 | 6/2022 | Wang et al. |
| 2022/0228997 A1 | 7/2022 | Sandu et al. |
| 2022/0317015 A1 | 10/2022 | Sun et al. |
| 2023/0375457 A1* | 11/2023 | Alabbad ............ G01N 33/24 |

FOREIGN PATENT DOCUMENTS

| | | |
|---|---|---|
| CN | 87213495 | 6/1988 |
| CN | 203785967 | 8/2014 |
| CN | 105784628 | 7/2016 |
| CN | 106525898 | 3/2017 |
| CN | 108152145 | 6/2018 |
| CN | 111380893 | 7/2020 |
| EP | 0210845 | 2/1987 |
| EP | 2040075 | 3/2009 |
| EP | 4028780 | 3/2021 |
| GB | 2161269 | 8/1988 |
| KR | 101384986 | 4/2014 |
| WO | WO 2010019256 | 2/2010 |
| WO | WO 2014008496 | 1/2014 |
| WO | WO 2014014919 | 1/2014 |
| WO | WO 2015058206 | 4/2015 |
| WO | WO 2016087397 | 6/2016 |
| WO | WO 2017164822 | 9/2017 |
| WO | WO 2020009981 | 1/2020 |
| WO | WO 2022159542 | 7/2022 |
| WO | WO 2022187600 | 9/2022 |

OTHER PUBLICATIONS

Andra et al., "Digital rock physics benchmarks—Part I: Imaging and segmentation," Computers & Geosciences, Jan. 2013, 50:25-32, 8 pages.

Andra et al., "Digital rock physics benchmarks—Part II: Computing effective properties," Computers & Geosciences, Jan. 2013, 50:33-43, 11 pages.

Arns et al., "Pore Scale Characterisation of Carbonates using X-ray microtomography," Paper presented at the SPE Annual Technical Conference and Exhibition, Sep. 26-29, 2004, 11 pages.

Atarita et al., "Predicting Distribution of Total Organic Carbon (TOC) and S2 with Δ Log Resistivity and Acoustic Impedance Inversion on Talang Akar Formation, Cipunegara Sub Basin, West Java," Procedia Engineering, 2017, 170:390-397, 8 pages.

Biot et al., "Temperature analysis in hydraulic fracturing," Journal of Petroleum Technology, Nov. 1987, 39(11):1389-1397, 9 pages.

Blanz et al., "Nuclear Magnetic Resonance Logging While Drilling (NMR-LWD): From an Experiment to a Day-to-Day Service for the Oil Industry," Diffusion Fundamentals, 2010, 14(2), 5 pages.

Bultreys et al., "Imaging and image-based fluid transport modeling at the pore scale in geological materials: A practical introduction to the current state-of-the-art," Earth-Science Reviews, Apr. 2016, 155:93-128, 36 pages.

Cahill et al., "Nanoscale thermal transport," Journal of Applied Physics, Jan. 15, 2003, 93(2):793-818, 27 pages.

Cahill et al., "Nanoscale Thermal Transport. II. 2003-2012," Applied Physics Reviews, 2014, 1(011305):1-46, 46 pages.

Clough et al., "Characterization of Kerogen and Source Rock Maturation Using Solid-State NMR Spectroscopy," Energy & Fuels, Sep. 15, 2015, 29(10):6370-6382, 42 pages.

Cnudde et al., "High-resolution X-ray computed tomography in geosciences: A review of the current technology and applications," Earth-Science Reviews, Aug. 1, 2013, 123:1-17, 17 pages.

Deng et al., "Evaluation of high-temperature deformation of porous asphalt mixtures based on microstructure using X-ray computed tomography," Construction and Building Materials, Dec. 10, 2019, 227(116623):1-10, 10 pages.

Ducros, "Source Rock Kinetics: Goal and Perspectives," Source Rock Kinetics: Goal and Perspectives. AAPG Geosciences Technology Workshop, Jul. 5, 2016, 30 pages.

Esfahani et al., "Quantitative nanoscale mapping of three-phase thermal conductivities in filled skutterudites via scanning thermal microscopy," National Science Review, Jun. 30, 2017, 5(1):59-69, 11 pages.

Gao et al., "A Surface Functional Monomer-Directing Strategy for Highly Dense Imprinting of TNT at Surface of Silica Nanoparticles," Journal of American Chemical Society, Jun. 6, 2007, 129(25):7859-7866, 8 pages.

Glatz et al., "An experimental platform for triaxial high-pressure/high-temperature testing of rocks using computed tomography," Review of Scientific Instruments, Apr. 5, 2018, 89(045101):1-10, 10 pages.

Goethals et al., "Comparison of Positron Emission Tomography and X-ray radiography for studies of physical processes in sandstone," Engineering Geology, Feb. 10, 2009, 103(3-4):134-138, 5 pages.

Hirono et al., "Porosity profile within the Taiwan Chelungpu Fault, reconstructed from X-ray computed tomography images," JAMSTEC Report of Research and Development, Sep. 2009, 9(2):15-22, 8 pages.

Hu et al., "Smart Liquid SERS Substrates based on Fe3O4/Au Nanoparticles with Reversibly Tunable Enhancement Factor for Practical Quantitative Detection," Scientific Report, Nov. 27, 2014, 4(7204), 10 pages.

Huang et al., "A new pyrolysis technique using a diamond anvil cell: in situ visualization of kerogen transformation," Organic Chemistry, Jan. 1996, 24(1):95-107, 13 pages.

(56) References Cited

OTHER PUBLICATIONS

Iglauer et al., "High pressure-elevated temperature x-ray micro-computed tomography for subsurface applications," Advances in Colloid and Interface Science, Jun. 2018, 256:393-410, 18 pages.
Iovea et al., "Dual-energy X-ray computer axial tomography and digital radiography investigation of cores and other objects of geological interest," Engineering Geology, Feb. 10, 2009, 103(3-4):119-126, 8 pages.
Jacobs et al., "'Applications of X-ray computed tomography in engineering geology' or 'looking inside rocks . . . '," Engineering Geology, Feb. 10, 2009, 103(3-4):67-68, 2 pages.
Kim et al., "Permeability and Porosity Evolution of Organic Rich Shales as a Result of Heating," Paper presented at the SPE Western Regional Meeting, Apr. 22, 2019, 43 pages.
Kim et al., "Permeability and Porosity Evolution of Organic-Rich Shales from the Green River Formation as a Result of Maturation," SPE-195366-PA, Jun. 11, 2020, 25(3):1377-1405, 29 pages.
Klapetek, "Chapter 11: Thermal Measurements," Quantitative Data Processing in Scanning Probe Microscopy: SPE Applications for Nanometrology, 2018, 26 pages.
Kobchenko et al., "4D imaging of fracturing in organic-rich shales during heating," Journal of Geophysical Research, Dec. 7, 2011, 116(B12201):1-9, 9 pages.
Lewan, "Evaluation of petroleum generation by hydrous pyrolysis experimentation," Phil. Trans. R. Soc. Lond. A, 1985, 315:123-134, 12 pages.
Lewan, "Experiments on the role of water in petroleum formation," Geochimica et Cosmochimica Acta, 1997, 61(17):3691-3723, 33 pages.
Lu et al., "Quantitative prediction of seismic rock physics of hybrid tight oil reservoirs of the Permian Lucaogou Formation, Junggar Basin, Northwest China," Journal of Asian Earth Sciences, 2019, 178:216-223, 8 pages.
Mao et al., "Chemical and nanometer-scale structure of kerogen and its change during thermal maturation investigated by advanced solid-state 13C NMR spectroscopy," Geochimica et Cosmochimica Acta, 2010, 74(7):2110-2127, 18 pages.
Matthews et al., "A review of the application of X-ray computed tomography to the study of coal," Fuel, Dec. 1, 2017, 209:10-24, 15 pages.
Meyer et al., "Identification of Source Rocks on Wireline Logs by Density/Resistivity and Sonic Transit Time/Resistivity Crossplots," The American Association of Petroleum Geologists Bulletin, Feb. 1984, 68(2):121-129, 9 pages.
Nie et al., "Probing Single Molecules and Single Nanoparticles by Surface-Enhanced Raman Scattering," Science, Feb. 21, 1997, 275(5303):1102-1106, 6 pages.
Panahi et al., "A 4D synchrotron X-ray tomography study of the formation of hydrocarbon migration pathways in heated organic-rich shale," SPE Journal, Apr. 2013, 366-377, 12 pages.
Pollock et al., "Micro-thermal analysis: techniques and applications," Journal of Physics D: Applied Physics, 2001, 34(9):R23-R53, 31 pages.
Ponomarev et al., "Tomography in Geology: 3D Modeling and Analysis of Structural Features of Rocks Using Computed Micro-Tomography," IOP Conf. Ser.: Mater. Sci. Eng., Oct. 1, 2016, 154(012030):1-6, 6 pages.
Radiologycafe.com [online], "CT equipment," Available on or before Jun. 13, 2021, retrieved on Dec. 26, 2023, URL <https://www.radiologycafe.com/frcr-physicsnotes/ct-imaging/ct-equipment/>, 10 pages.
Radiopaedia.org [online], "Image reconstruction (CT)," Available on or before Jun. 29, 2019, Internet Archive: Wayback Machine URL<http://web.archive.org/web/20190629013455/https://radiopaedia.org/articles/image-reconstruction-ct?lang-us>, Retrieved on Dec. 26, 2023, URL <https://radiopaedia.org/articles/image-reconstruction-ct?lang=us>, 7 pages.
Rashadan et al., "Effect of the Preparation Route, PEG and Annealing on the Phase Stability of Fe3O4 Nanoparticles and Their Magnetic Properties," Journal of Experimental Nanoscience, Aug. 4, 2011, 8(2):210-222, 14 pages.
Rodriguez et al., "Imaging Techniques for Analyzing Shale Pores and Minerals," NETL-TRS-6-2014, Dec. 2, 2014, 44 pages.
Saif et al., "Dynamic imaging of oil shale pyrolysis using synchrotron X-ray microtomography," Geophysical Research Letters, Jul. 2, 2016, 43:6799-6807, 9 pages.
Saif et al., "Microstructural imaging and characterization of oil shale before and after pyrolysis," Fuel, Jun. 1, 2017, 197:562-574, 13 pages.
Saif et al., "Multi-scale multi-dimensional microstructure imaging of oil shale pyrolysis using X-ray micro-tomography, automated ultra-high resolution SEM, MAPS Mineralogy and FIB-SEM," Applied Energy, Sep. 15, 2017, 202:628-647, 20 pages.
Saxena et al., "Rock properties from micro-CT images: Digital rock transforms for resolution, pore volume, and field of view," Advances in Water Resources, Dec. 2019, 134(103419):1-13, 13 pages.
Solomon et al., "Synthesis and Study of Silver Nanoparticles," Journal of Chemical Education, Feb. 2007, 84(2):322-325, 4 pages.
Stiles et al., "Surface-Enhanced Raman Spectroscopy," Annual Review of Analytical Chemistry, Mar. 18, 2008, 1(1):601-626, 29 pages.
Tabatabaei et al., "Well performance diagnosis with temperature profile measurements," in SPE Annual Technical Conference and Exhibition, Society of Petroleum Engineers, Oct. 30-Nov. 2, 2011, 16 pages.
Tathed et al., "Hydrocarbon saturation in Bakken Petroleum System based on joint inversion of resistivity and dielectric dispersion logs," Fuel, Dec. 2018, 233:45-55, 11 pages.
Trippetta et al., "The seismic signature of heavy oil on carbonate reservoir through laboratory experiments and AVA modelling," Journal of Petroleum Science and Engineering, 2019, 177:849-860, 12 pages.
Tu et al., "Development of LabVIEW Based Micro Computed Tomography System on Vertical Rotary Gantry," IFMBE Proceedings, Jan. 2015, 45:273-276, 4 pages.
Van Lieshout et al., "Programmed-temperature vaporiser injector as a new analytical tool for combined thermal desorption-pyrolysis of solid samples Application to geochemical analysis," Journal of Chromatography A, Mar. 1997, 764(1):73-84, 12 pages.
Wildenschild et al., "X-ray imaging and analysis techniques for quantifying pore-scale structure and processes in subsurface porous medium systems," Advances in Water Resources, Jan. 2013, 51:217-246, 30 pages.
Wu et al., "An experimental study of organic matter, minerals and porosity evolution in shales within high-temperature and high-pressure constraints," Marine and Petroleum Geology, Apr. 2019, 102:377-390, 14 pages.
Yang et al., "Nanoscale geochemical and geomechanical characterization of organic matter in shale," Nature Communications, Dec. 19, 2017, 8(2179):1-9, 9 pages.

* cited by examiner

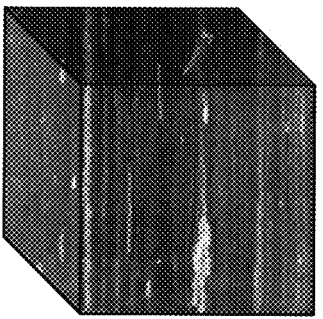
FIG. 3A
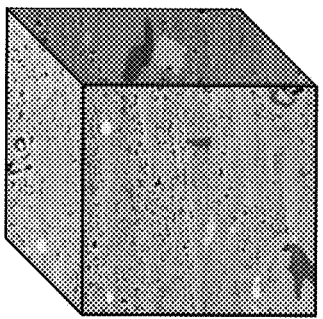
FIG. 3B
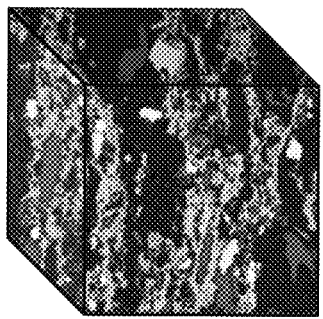
FIG. 3C
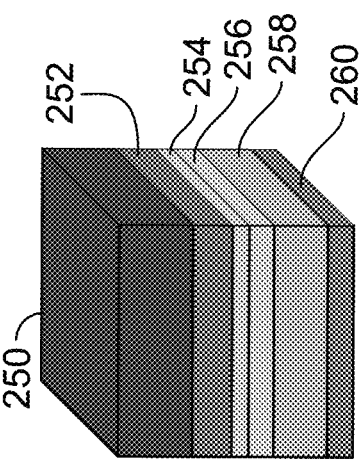
FIG. 3D
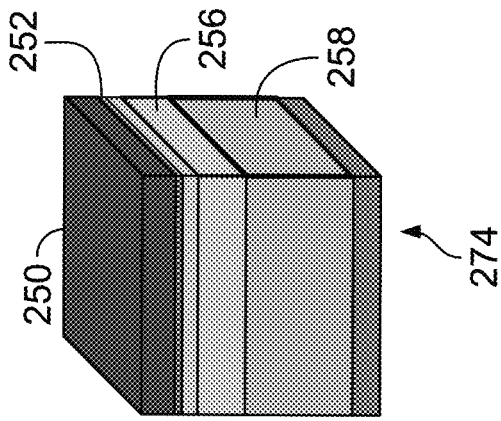
FIG. 4
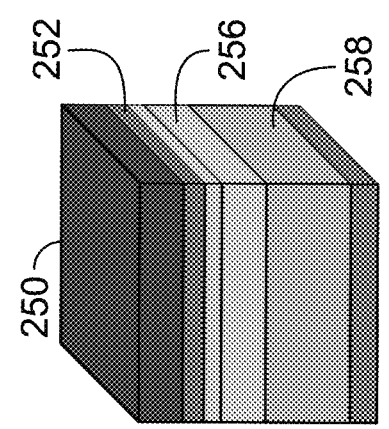

EVALUATING SOURCE ROCK BASED ON TIME SERIES ANALYSIS

TECHNICAL DESCRIPTION

This disclosure relates to evaluating source rock samples taken from subterranean geological formations.

BACKGROUND

The quality of the source rock of a subterranean formation is one of the factors that determines the feasibility of extracting hydrocarbons from an oil field and the design of the extraction operation. It is difficult to determine if hydrocarbons are actually present in a target zone before drilling a well. Hydrocarbon presence can be assessed using a basin scale analysis that involves source rock yield according to the evolution history of the basin and based on the source rock quality. Laboratory experiments can characterize the quality of source rock and the potential hydrocarbon yield of the source rock through artificial maturation or pyrolysis experiments conducted in a temperature and pressure-controlled reactor.

SUMMARY

This specification describes an approach for evaluating the quality of source rock based on a time-series analysis. This approach uses systems that noninvasively image the source rock sample within a chemical reactor to acquire real time images of the source rock sample during pyrolysis experiments. The hydrocarbon yield potential of a source rock sample can be determined by measuring the hydrocarbon yield of a sample of the source rock after undergoing artificial maturation (e.g., pyrolysis) in a temperature- and pressure-controlled reactor. The evaluation is performed while the source rock sample is undergoing thermal degradation (pyrolysis) in the absence of oxygen and in the presence of water, as well as on the products resulting from the degradation process.

In one aspect, a system for evaluating source rock includes a reactor vessel including a body with an internal cavity sized to receive a sample holder, a heating system, a radiation source and a detector bracketing the reactor vessel, wherein the radiation source, the detector, and the reactor vessel are rotatable relative to each other; and a processor in communication with the detector, the processor causing performance of operations including: obtaining a plurality of measurements of a source rock sample, generating a conceptual model of the source rock sample based on the plurality of measurements obtained, and determining one or more properties of the source rock sample based on the conceptual model.

In one aspect, a method for evaluating source rock includes obtaining a source rock sample from a subsurface formation, disposing the source rock sample in a reactor vessel, applying heat and pressure to the source rock sample in the reactor vessel to simulate maturation of the subsurface formation, and while applying the heat and pressure, rotating a radiation source and a detector and the reactor vessel relative to each other to obtain a plurality of three-dimensional images of the source rock sample at different times.

Embodiments of these systems and methods can include one or more of the following features.

In some embodiments, the reactor vessel is fixed in position and the radiation source and the detector are rotatable around the reactor vessel.

In some embodiments these aspects further include assigning an evaluation index to an oil field based on one or more properties of the source rock sample. In some cases, the aspects further include determining the configuration of field equipment to be used in a hydrocarbon extraction based on the assigned evaluation index.

In some embodiments, the measurements of the source rock sample comprise a series of micro-CT scans. In some cases, the aspects further comprise applying an image segmentation algorithm to a volume of the micro-CT scans.

In some embodiments, radiation source comprises an X-ray radiation source.

In some embodiments, the plurality of measurements is obtained during an artificial maturation experiment.

In some embodiments, the aspects further include determining kinetic parameters of the source rock sample based on the plurality of measurements obtained.

Certain implementations may have particular advantages. This approach has the advantage that quantitative parameters can be determined without the need to set up multiple experiments thus speeding the analysis and reducing the cost of experiments. Also, by enabling real-time access to the source rock parameters during transformation, new evolution-based parameters can be investigated. Examples of evolution-based parameters include production rate, alteration rate, pore volume evolution, mineral and organic phase transformation.

The details of one or more embodiments of this approach are set forth in the accompanying drawings and the description below. Other features, objects, and advantages of the systems and methods will be apparent from the description and drawings, and from the claims.

DESCRIPTION OF DRAWINGS

FIG. 3A-3D are a series of representations of the source rock sample obtained during an implementation of this approach.

FIG. 4 is an example time-series of model realizations.

DETAILED DESCRIPTION

This specification describes an approach to evaluating source rock samples during artificial maturation experiments. This approach uses systems that noninvasively image the source rock sample within a chemical reactor to acquire real time images of the source rock sample during pyrolysis experiments. The hydrocarbon yield potential of a source rock sample can be determined by measuring the hydrocarbon yield of a sample of the source rock after undergoing artificial maturation (e.g., pyrolysis) in a temperature- and pressure-controlled reactor. The evaluation is performed while the source rock sample is undergoing thermal degradation (pyrolysis) in the absence of oxygen and in the presence of water, as well as on the products resulting from the degradation process. Real time image acquisition of the source rock sample can be performed using a micro-computed tomography (micro-CT) scan instrument during pyrolysis experiments to noninvasively image the source rock sample within a chemical reactor. Quantitative measurements can then be obtained by integrating a time-series of one or more features imaged during the pyrolysis experiments.

Figure 1:
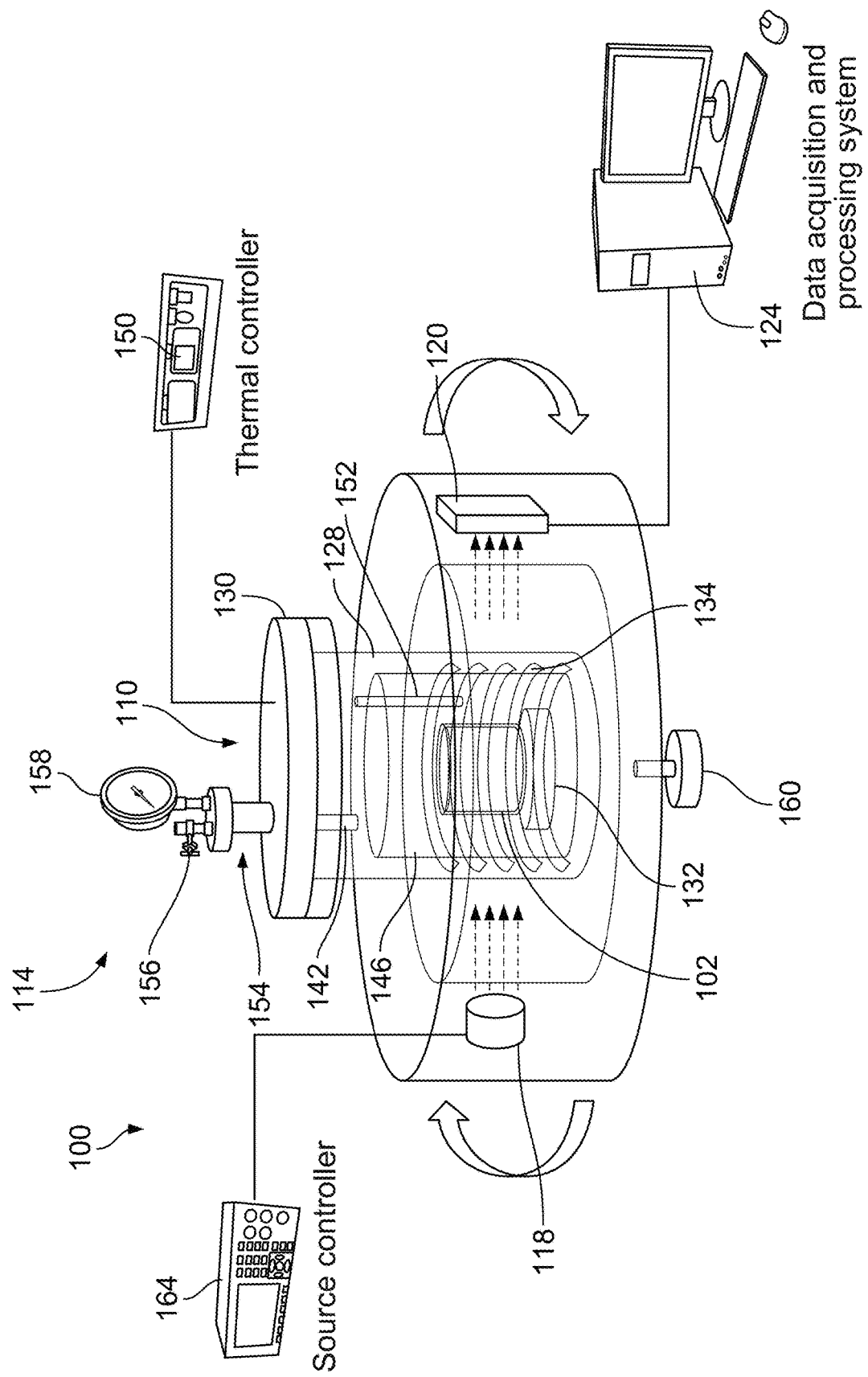
FIG. 1 illustrates a system for evaluating source rock.

FIG. 1 shows a pyrolysis system 100 for evaluating a source rock sample 102 taken, for example, from a subterranean reservoir. The pyrolysis system 100 includes a reactor vessel 110, an environmental control system 114, a radiation source 118 (e.g., an X-ray source) to bombard the source rock sample 102, a radiation detector (e.g., an X-ray detector) panel 120, and a data acquisition and processing system (DAPS) 124. The reactor vessel 110 can be made from metal-based material such as stainless steel, aluminum, copper, metal-based composite, or combinations of these materials. The reactor vessel 110 includes a body 128 with an open end, a cover 130 attached to the body 128, a source rock sample holder 132, a heating system 134, and a collector assembly 142. The body 128 and the cover 130 form a sealable chamber 146. The sealable chamber 146 maintains an anoxic (i.e., oxygen-free) environment for the source rock sample 102 under evaluation. The inner volume of the sealable chamber 146 is partially filled with a liquid solution. The liquid solution typically includes artificial seawater similar in composition to the liquid in the subsurface reservoir that fills the pores of the source rock. The liquid solution fills the pores of the source rock sample 102. The liquid solution also provides a conduit for the products of the reaction to reach the surface of the liquid for post experiment collection.

The liquid solution allows a transfer of generated products (e.g., oil or gas) during the reaction to the collector assembly 142 for monitoring and sampling. The collector assembly 142 collects the generated products and classifies them into a designated oil section and a gas section as part of the assembly 142 The liquid solution inside the reactor vessel 110 also allows heat transfer to the source rock sample 102 from the heating system 134. The heating system 134 (e.g., a heating coil) is positioned along the inner walls of the reactor vessel 110. The heating system 134 is connected to a thermal controller 150 that allows a user to interact with the environment inside the reactor vessel 110. The heating system 134 and the thermal controller 150 are part of the environmental control system 114.

The environmental control system 114 includes additional active and passive elements that continuously interact with the environment inside the reactor vessel 110. The active and passive elements include temperature and pressure control and monitoring elements. For example, a temperature probe 152 is connected to the thermal controller 150 and measures the temperature inside the reactor vessel 110. The pressure control elements include a pressure control inlet 154 that allows access to the reactor vessel 110. The pressure control inlet 154 includes a pressure gauge 158 that measures the pressure inside the reactor vessel 110, and a control valve 156 that allows to vent off gases from the reactor vessel 110. The elements of the environmental control system 114 constrain the pressure and temperature conditions inside the reactor vessel 110 and conform to pre-assigned experimental values set by the user. This enables a safe operation of the reactor vessel 110.

The reactor vessel 110 also includes the source rock sample holder 132 that is seated inside the sealable chamber 146. The source rock sample holder 132 contains the source rock sample 102 during thermal transformation and preserves the residual for experimental analysis.

The radiation source 118 and radiation detector panel 120 and the source rock sample 102 are rotatable relative to each other. In the pyrolysis system 100, the reactor vessel 110 is fixed in position. The radiation source 118 and the radiation detector panel 120 are coupled to a rotating stage 160 which, in operation, rotates them around the reactor vessel 110. For example, the radiation source 118 and the radiation detector panel 120 can be mounted on a rotary gantry that allows a full 360° of rotation around the reactor vessel 110. The radiation source 118 and radiation detector panel 120 can be configured as a micro-CT scanner that rotates around the source rock sample to obtain a volume scan of the sample 102. In some systems, the radiation source 118 and radiation detector panel 120 may be fixed in position and the reactor vessel 110 is rotatable (e.g., coupled to the rotating stage 160) while the micro-CT scanner obtains a volume scan of the sample 102. Many X-ray projections are collected where the intensity at the radiation detector panel 120 corresponds to the X-ray intensity passing through the source rock sample. The micro-CT system can reconstruct a three-dimensional digital volume of the source rock sample 102 by combining many (e.g., 720 or more) projections. The number of projections affects the accuracy and angular resolution of the reconstructed data. For example, samples with a fine texture may need a minimum of 720 projections to reach a desired resolution while a sample with coarser textures may only need 360 projections to achieve a suitable resolution. The brightness or grayscale intensity of an X-ray projection represents X-ray radiation attenuation due to dispersion and absorption of the radiation passing through the source rock sample 102. Complex algorithms are implemented on the DAPS 124 to create a digital reconstruction of the scanned volume based on multiple X-ray projections and to remove the effects of the chemical reactor vessel 110 walls. The algorithms combine multiple flat images acquired during a complete scan session and apply a set of filters to remove unwanted effects and noise to create a 3D digital volume. Example reconstruction algorithms include iterative reconstruction without statistical modeling, iterative reconstruction with statistical modeling, back projection, and filtered back projection.

The micro-CT system is instructed by a source controller 164 to execute a complete scan session at predefined time intervals to acquire a time series of measurements (e.g., micro-CT scans). At the same time, the thermal controller 150 maintains the temperature inside the chemical reactor vessel 110 according to a predefined setting. For example, the temperature inside the chemical reactor vessel 110 can be configured to follow a certain evolution in time to induce a specific maturation rate. The organic matter within the source rock sample 102 chemically transforms in time based on the chemistry of the source rock components. The transformation induces various changes in the acquired signal obtained by the radiation detector panel 120, and the variations are transferred to the DAPS 124 for processing.

The thermal degradation process is associated with the source rock sample 102 artificially maturing over time by consuming the original organic matter present within the source rock sample 102 to produce hydrocarbons (e.g., oil and gas). The aim of the measurements is to determine a plurality of characteristics of the source rock and pyrolysis products that can be used to enhance a hydrocarbon extraction activity. As the source rock sample 102 inside the reactor vessel 110 undergoes artificial maturation, the chemical reactions that are controlled by the environmental condition transform the properties of the source rock sample 102 (e.g., bulk density, porosity, organic content, and fluid saturations). The changes in properties are detected during a time series of micro-CT scans while the sample is heated under confining pressures. The measurements are integrated using specific computer implemented algorithms to infer the source rock properties. The algorithms can be designed to integrate the whole reconstructed scanned volume or specific zones within the reconstructed scanned volume when inferring source rock properties. In some implementations, certain components of the sample rock may not be expected to change within the temperature range of the experiment. In these implementations, comparing or integrating over the whole reconstructed volume may not be necessary and only the specific zones (e.g., organic rich zones) where the sample rock is expected to change may be integrated.

Figure 2A:
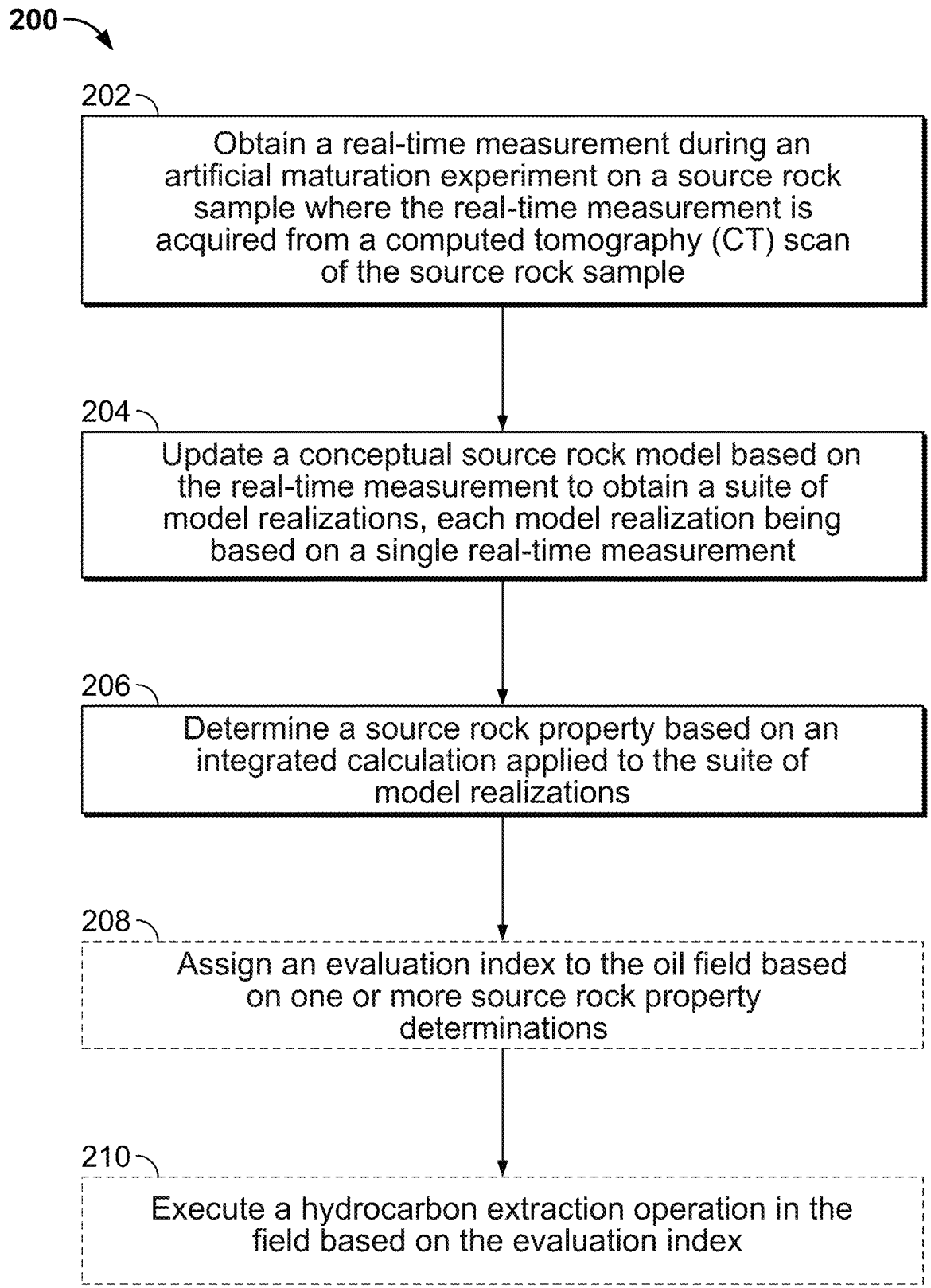
FIGS. 2A-2B show flow diagrams for example implementations of this approach to evaluating source rock samples.

FIG. 2A is a flow chart for a method 200 of evaluating a source rock sample. The method 200 by acquiring a computed tomography (CT) scan of a source rock sample undergoing artificial maturation (step 202). This scan may occur in real-time (e.g., while the artificial maturation experiment is in progress). The scan may be stored in a database for processing later. In some implementations, the temperature program of the artificial maturation can be set with heat and then hold periods so the scans and resulting reconstructions can be synchronized with the heating experiment. In an example implementation, a scan can be completed in about 30 minutes.

For each scan of the source rock sample, a conceptual source rock model is generated based on the computed tomography measurement (step 204). The conceptual source rock model is a numerical representation of the source rock containing one or more source rock characteristics of interest, for example, bulk density, porosity, organic content, or fluid saturations. In some implementations, an image processing system can be used to analyze the reconstructed scanned volume and identify the zones of interest. In some implementations, the artificial maturation does not need to be paused for the generation of the conceptual model, and the conceptual model can be generated in parallel with the experiments. Depending on the duration of the artificial maturation and temperature ramp, some model realizations can be computed in real time.

For example, with proper calibration of the grayscale intensity, the algorithms can search for organic rich domains within the reconstructed scanned volume and integrate the total volume of organic matter visible at the micro-CT scale. With a known density of the organic matter, the volume can be converted to mass. In another instance, the spatial relationship among features (e.g., large organic domains or organic filled laminations) may be analyzed to determine source rock parameters. For example, at a reconstructed micro-CT resolution of 1 μm/voxel, based on the location of organic rich particles, areas of organic porosity or adsorbed hydrocarbons can be identified and quantified using the grayscale calibration and known density of the organic matter. In another instance, properties of the source rock can be determined from the bulk analysis of the scanned volume. For example, the attenuation of the total received radiation intensity can be associated with the density loss of the source rock, which in turn can be tracked to total organic matter transformation. Similarly, for reconstructed micro-CT volumes, with proper calibration of the grayscale intensity to the bulk density the integrated intensity along the source rock sample can be converted to a bulk density along the source rock sample or at any specified point. Each reconstructed CT volume can be used to determine the bulk density for the whole volume and see variations in density along the sample.

Each conceptual model generated represents the state of the source rock at a specific moment in time. If a time series of CT scans are acquired, a corresponding time-series of conceptual model realizations can be generated. The conceptual model can also be updated to change the variables associated with each characteristic, to obtain new realizations of the conceptual model without changing the framework of relationships among the characteristics. The updates can be obtained from a series of segmented volumes derived at each time step in the time series.

One or more properties of the source rock are determined by applying an integrated calculation to a time-series of model realizations (step 206). Some source rock properties are quantifiable from a single CT volume scan while other properties can only be derived by observing the evolution of the source rock property through time. Changes in these time-dependent properties can be tracked using multiple reconstructed CT volumes along the temperature ramp of an artificial maturation experiment. For example, by detecting and integrating the source rock fabric evolution, the clay mineral catalysis effect can be quantified as it is controlled by the extent to which organic matter and clay minerals are physically associated. In another instance, with multiple micro-CT volumes collected at different levels of thermal alteration, the bulk density can be tracked where reductions in bulk density can be related to conversion of organic matter to hydrocarbons (e.g., oil and gas). Other examples of evolution-based parameters include production rate, alteration rate, pore volume evolution, and mineral and organic phase transformation.

An evaluation index can be assigned to the oil field based on one or more source rock property determinations (step 208). Once the source rock properties are determined they can be used to configure an oil field simulator to obtain a production estimate of the oil field. The oil field simulator scales the source rock properties with other parameters of the field to quantify the amount of hydrocarbons potentially charging the oil field accumulations or the ability of the reservoir to release the hydrocarbons for production. For example, an oil field simulator may be a basin model simulator that is designed to simulate the source rock evolution within a geologic framework of the basin to which the oil field belongs. The basin simulator offers estimates of the hydrocarbons that may be available in the oil field and based on further oil field properties, the estimates of the production. Another example may be a reservoir model, which is designed to calculate the production of the well based on source rock properties and other properties. The production estimates from either simulator can be related mathematically to a field estimator index that can quantify for example the business risk to exploit the hydrocarbons in the oil field.

In some implementations, a field operation that aims to extract the hydrocarbons for commercial use can be initiated based on the evaluation index (step 210). In addition, the field estimator index can be used to determine the configuration of the field equipment associated with the hydrocarbon production.

Figure 2B:
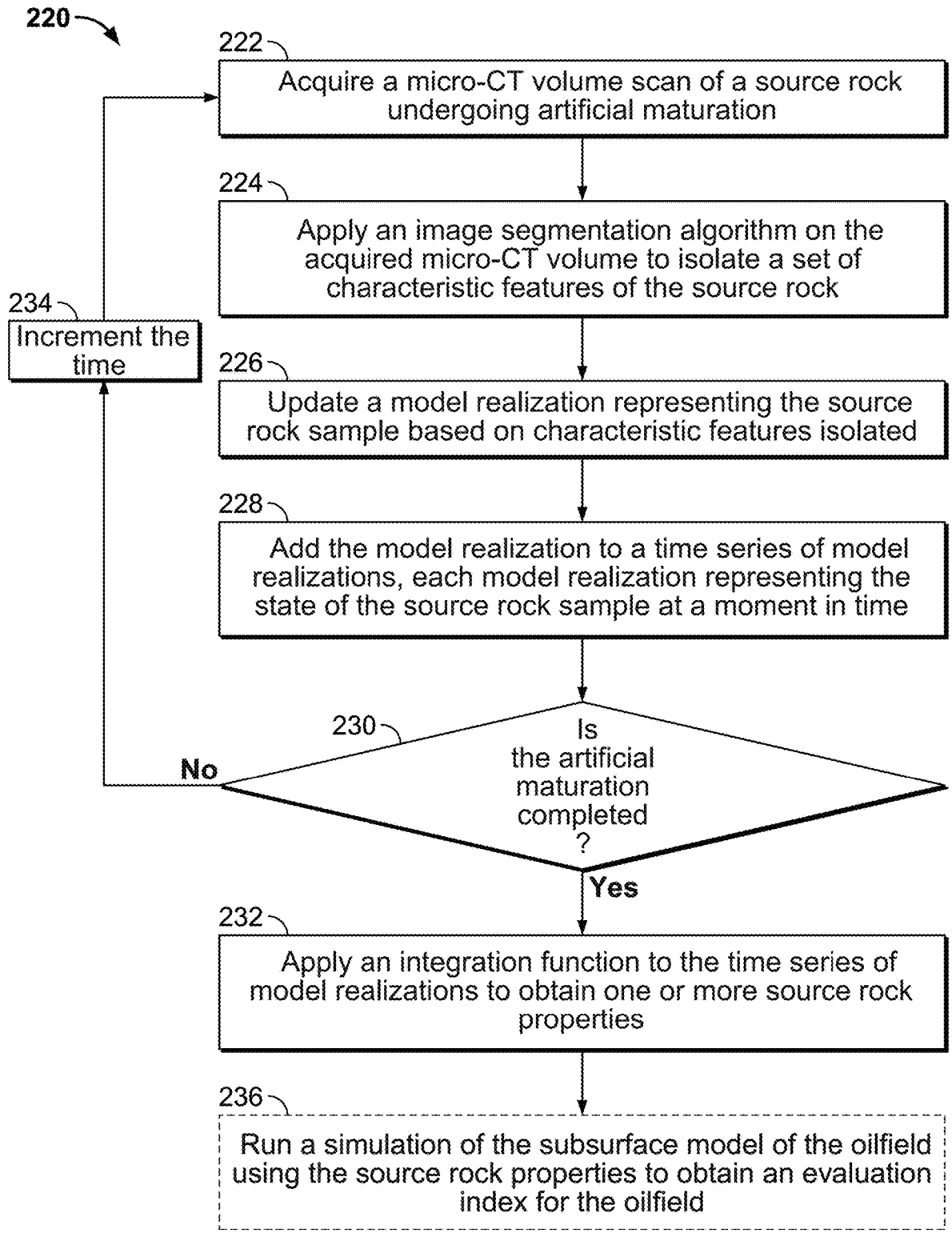

FIG. 2B is a flow diagram for an alternate implementation 220 of this approach. A micro-CT volume scan of a source rock undergoing artificial maturation is acquired (step 222). An image segmentation algorithm is applied on the acquired micro-CT volume to isolate a set of characteristic features of the source rock (step 224). A model realization representing the source rock sample is updated based on characteristic features isolated (step 226). The model realization is added to a time series of model realizations, each model realization representing the state of the source rock sample at a moment in time (step 228). A test is made to decide if the artificial maturation of the source rock is completed (step 230). The test can be based on several properties measured at each time step. For example, if a measured production rate falls below a specified threshold, the maturation can be considered completed. If the maturation is completed, an integration function is applied to the time series of model realizations to obtain one or more source rock properties (step 232). If the maturation is not completed, the experimental time is incremented (step 234) and a new micro-CT volume scan is acquired (step 222). In some implementations, a series of previously acquired micro-CT volume scans that were stored in a database can be loaded by a processor in sequential order. A simulation of the subsurface model of the oilfield can be run using the source rock properties to obtain an evaluation index for the oilfield (step 236).

FIGS. 3A-3D show a series of graphical representations of the source rock sample obtained during an implementation of the method 200. FIG. 3A presents an example of a source rock sample with characteristic visual texture. The source rock sample is collected during exploratory field operations, for example by extracting a core of the rock during drilling through a source rock formation. The source rock sample contains a set of matrix minerals, an assemblage of organic material grains and various amounts of oil, gas, and water filling the pore space. A micro-CT scan of the source rock produces a digital rock volume like the example in FIG. 3B. The digital rock volume is obtained after complex algorithms are applied to the signal acquired from the micro-CT scan system. FIG. 3C presents an example of a segmented volume obtained by mapping the zones within the digital rock with certain physical and spatial characteristics. The volume can be segmented by applying an image segmentation algorithm to the digital rock volume shown in FIG. 3B. FIG. 3D shows a realization of a conceptual model based on the volumetric calculation performed on the zones mapped in the segmented volume (FIG. 3C). The conceptual model realization does not have to visually resemble the digital rock volume or the segmented rock volume, but it should represent the physical elements required to obtain the desired source rock properties. In this example, the volume fraction of various components within the source rock sample are represented. The source rock contains water 250, organic matter 252, mineral 254, gas 256, oil 258 and a second mineral 260. In this example, the volume fractions are calculated by integrating the volume of the various components identified in the segmented volume for the specified time step. Evolution-based parameters of the source rock (e.g., kinetic parameters) are obtained by integrating the evolution of the volume of organic matter or the volume of oil and gas across multiple time steps. In another instance, the model realization may contain geometric characteristics of organic matter grains, or the level of dispersion of organic matter within the source rock volume, for example, when adsorption parameters are calculated.

FIG. 4 presents an example of a time series of conceptual model realizations obtained from digital volume measurements. A model realization is built for each time step in the time series. Each realization is based on measurements acquired within that time step. Some source rock parameters (e.g., time-dependent parameters) are not directly calculable from a single measurement. A time series including multiple model realizations can be used to determine characteristics of the source rock by using the rate of change of the model elements rather than the composition of elements in a single realization. By evaluating time-series measurements, the pyrolysis environment can be evolved rather than static. For example, different heating ramps can be applied to the experiment to observe the evolution of parameters rather than having measurements taken at a singular temperature. FIG. 4 shows an example of the changes in composition of the model for three time steps (realizations) from the time series of model realizations. In a first time step 270, there are large portions of the volume containing water 250 and organic matter 252. There are also portions composed of gas 256 and oil 258. In a second time step 272, occurring after the first time step 270, the proportion of the volume composed of water 250 and organic matter 252 has decreased while the proportion of the volume composed of gas 256 and oil 258 has increased. In a third time step 274, occurring after the second time step 272, the proportion of the volume composed of water 250 and organic matter 252 has decreased further and the proportion of the volume composed of gas 256 and oil 258 has increased further.

A goal of the method 200 is to evaluate characteristics of a source rock sample 102 that can be used in oil field exploitation. For example, the kinetic parameters of the source rock regarding hydrocarbon components are used to predict the potential volume of oil in place for an oilfield.

Figure 5:
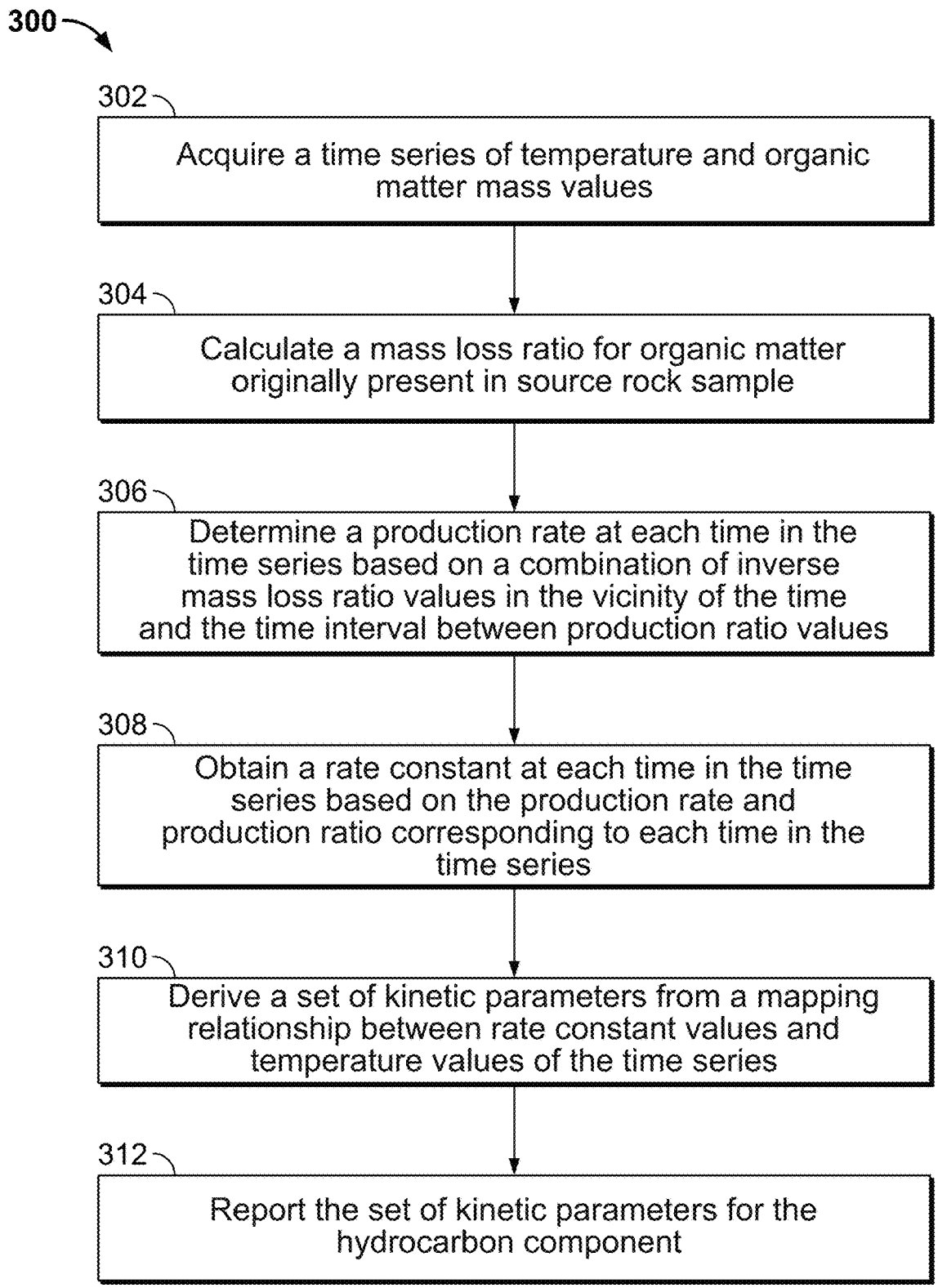
FIG. 5 is a flow chart demonstrating an approach to obtain kinetic parameters from the time-series integration of model realizations.

FIG. 5. presents a workflow 300 to obtain a set of kinetic parameters based on the time series integration of model realizations. A time-series of temperature and organic matter mass values are acquired (step 302) by, for example, an implementation of the method 200. A mass loss ratio for organic matter originally present in the source rock sample 102 can be calculated (step 304). The normalized mass loss ratio, X, is calculated as follows:

$$X = \frac{X_i - X_{residual}}{X_{max} - X_{residual}},$$

where $X_i$ is the instant mass of organic matter at a measuring moment, $X_{max}$ is the initial organic matter mass at the beginning of the experiment, and $X_{residual}$ is the residual mass of inert organic matter at the end of the experiment. The production of hydrocarbons, Y, is assumed to scale with the organic mass loss ratio, X, $$Y = 1 - X.$$

A production rate at each time step in the time series can be calculated based on the inverse of the mass loss ratio values in the vicinity of the time step and the time interval between production ratio values (step 306). In other words, a forward difference numerical approximation of the first derivative of the production of hydrocarbons Y with respect to time can be calculated, $$\frac{dY(t)}{dt} \simeq \frac{Y(t+\Delta t) - Y(t)}{\Delta t},$$

where t is time and $\Delta t$ is the time between time steps. For a reaction X→Y, the production rate is $$\frac{dY(t)}{dt} = -\frac{dX(t)}{dt} = k \cdot X(t),$$

where k is a rate constant. From mass conservation $Y(t) = 1 - X(t)$ thus $$\frac{dY(t)}{dt} = k(1 - Y(t)).$$

The rate constant can be obtained from the production rate for each time step in the time series (step 308) by rearranging the above equation:

$$k = \frac{dY(t)}{dt} \frac{1}{(1 - Y(t))}.$$

A set of kinetic parameters can be derived from a mapping of the relationship between the rate constant k and the temperature values of the time series (step 310). For example, using the Arrhenius equation:

$$k(T) = A e^{-E_a/RT} \rightarrow \ln(k(T)) = \ln(A) - \frac{E_a}{RT},$$

where T is the reaction temperature, R is the universal gas constant, A is a frequency factor and $E_a$ is the equivalent activation energy. Plotting the natural log of the rate constant, $\ln(k(T))$, versus the inverse of the temperature, 1/T, a linear curve fit of the form $y(x) = a + bx$ can be calculated with intercept $a = \ln(A)$ and slope $b = -E_a/R$. The slope and intercept can then be used to solve for the frequency factor A and the equivalent activation energy $E_a$:

$$A = e^a \text{ and } E_a = -bR.$$

The calculated kinetic parameters can be reported for the relevant hydrocarbon component for use in modeling of the subsurface oil reservoir (step 312). The determination of kinetic parameters can be done for separate components and not only the bulk oil. The calculated kinetic parameters can be reported to a basin simulator, for example.

Figure 6:
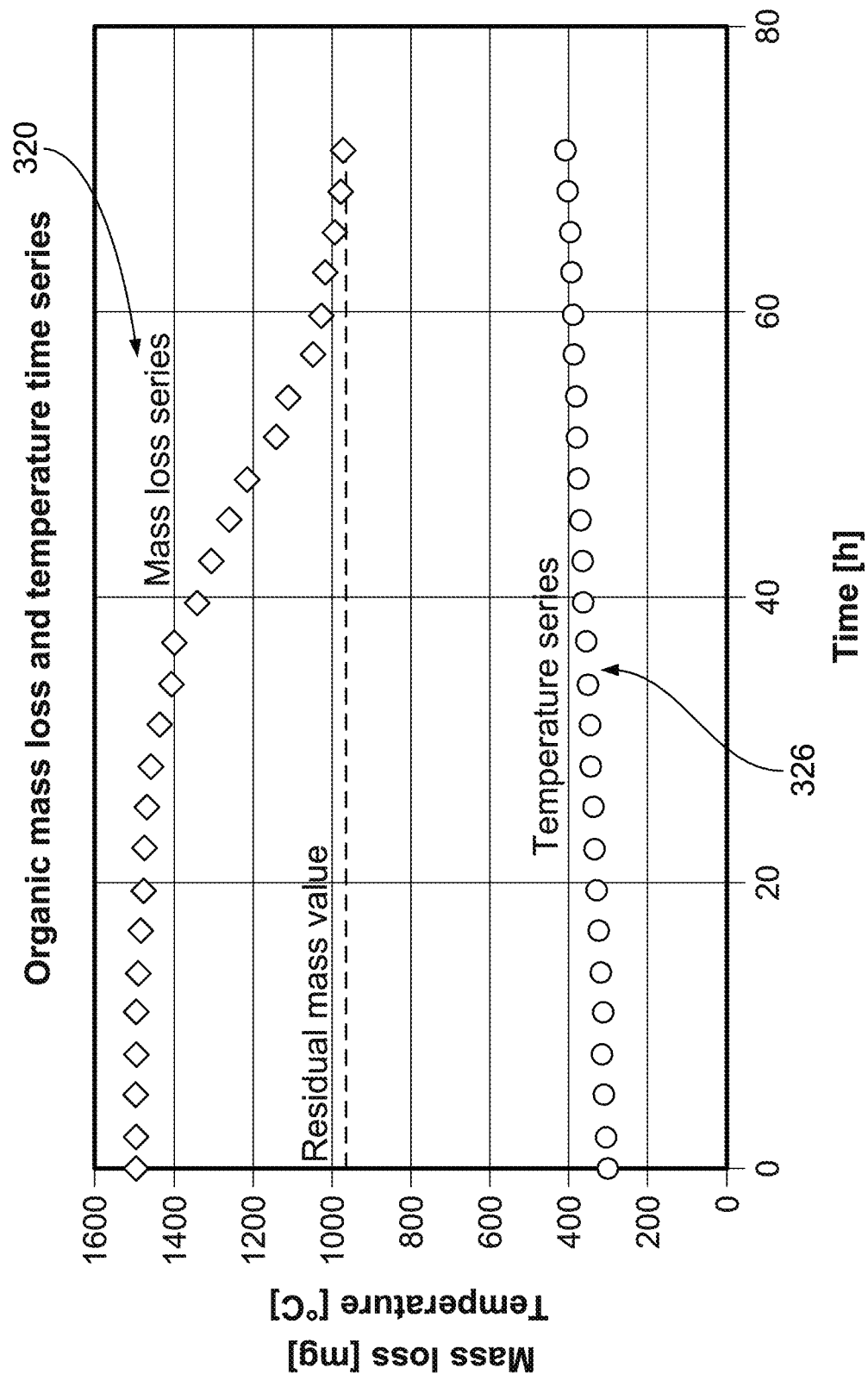
FIG. 6 is an example plot of temperatures and cumulated organic mass loss values from an implementation of this approach.
Figure 7:
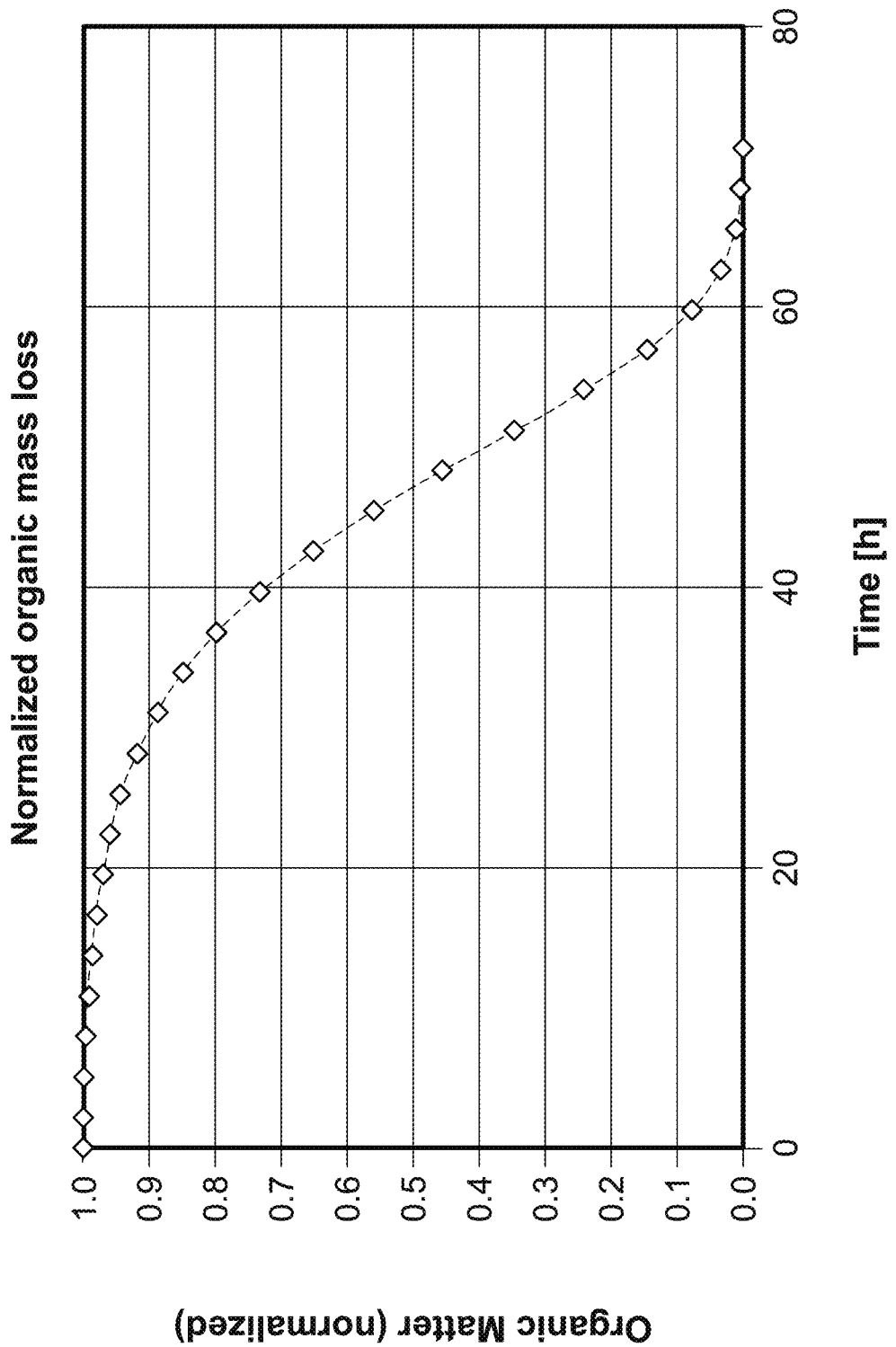
FIG. 7 is a plot of normalized organic matter mass evolution through time.
Figure 8:
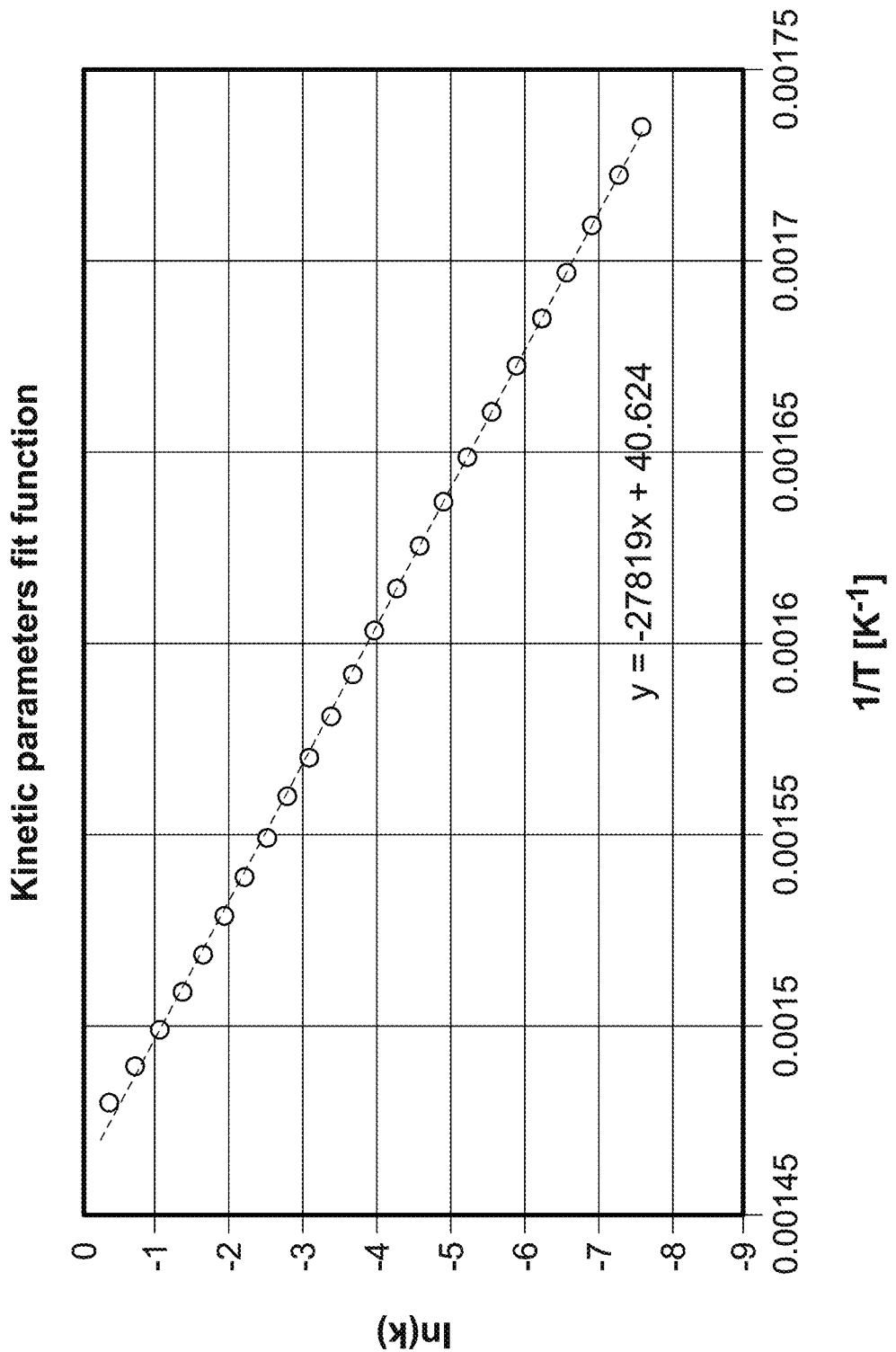
FIG. 8 is a plot showing an example relationship between rate constant and temperature used to fit kinetic parameters.

FIGS. 6-8 illustrate examples of the successive steps to obtain the kinetic parameters according to the workflow 300 based on a set of simulated organic matter evolution data as may be recorded by implementing the method 200. FIG. 6 shows an example plot of reaction temperatures and cumulated organic mass loss values measured during an implementation of this method 200. The organic mass loss series 320 has a starting value at time 0 h of approximately 1500 mg. This defines the value $X_{max}$. As time progresses, the organic mass decreases and asymptotically approaches a minimum residual mass value, $X_{residual}$. In this example, the residual mass value is slightly less than 1000 mg. The temperature series 326 begins with an initial temperature near 300° C. rising linearly to a value near 400° C. at the end of the experiment.

FIG. 7 shows an example of normalized organic mass loss X versus time from an implementation of the method 200. Here the normalized organic matter starts at a value of 1 at time 0 h. Initially, X decreases slowly with an increasingly steep negative slope until it reaches an inflection point near 50 h after which it approaches a value of 0 asymptotically as the experiment concludes. This plot yields a production ratio at any moment of the experiment.

FIG. 8 shows a graphical representation of the Arrhenius equation mapping the reaction rate constant to the reaction temperature at any moment of the experiment. The natural log of the rate constant, $\ln(k(T))$, is plotted on the y-axis and the inverse reaction temperature, 1/T, is plotted on the x-axis. The kinetic parameters representing the equivalent activation energy ($E_a$) and frequency factor (A) are obtained from the slope and intercept of a linear fit line that best matches the mapping relationship between the reaction rate constant and the reaction temperature. For this example, the value of the slope is −27819 and the value of the intercept is 40.624. These values correspond to values of the equivalent activation energy $E_a$=53.97 kcal/mol and a frequency factor A=1.42×10$^{17}$ h$^{-1}$.

Figure 9:
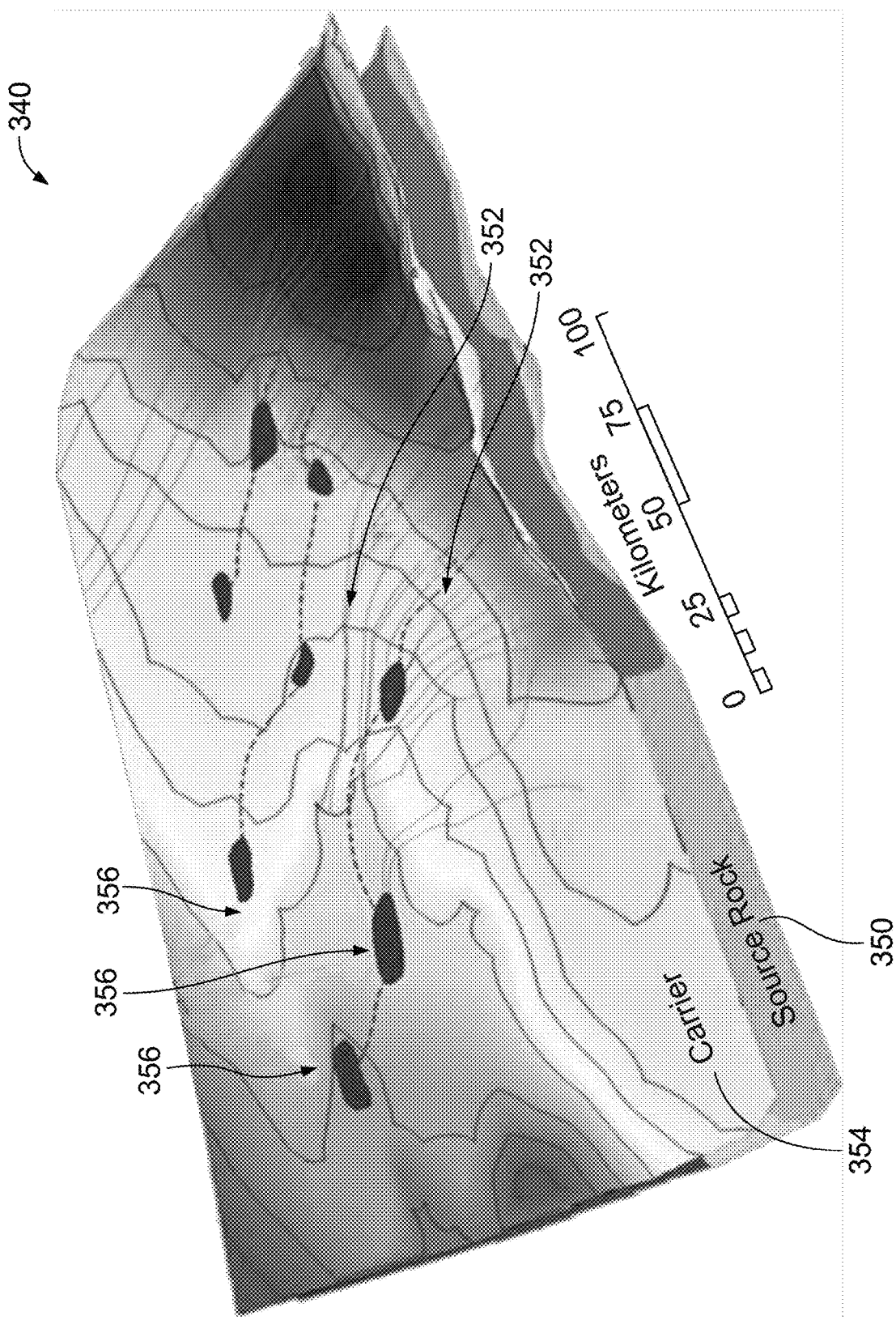
FIG. 9 shows an example of a field model simulation based on kinetic parameters to obtain a field evaluation index.

FIG. 9 presents an example of a basin simulation 340 performed using the set of kinetic parameters applied to the source rock in the field. The kinetic parameters and other parameters obtained by methods and instruments of this disclosure are used in the basin simulation to simulate the source rock 350 evolution and predict the probability and location of the hydrocarbon accumulations. As can be seen in FIG. 9, the simulation calculates the hydrocarbon volumes produced by the source rock across the basin and the hydrocarbon migrations 352 on a carrier bed 354 in a reservoir rock. Predicting the volume of hydrocarbon accumulations and location of the fields 356 are necessary for operations to extract the hydrocarbon.

Figure 10:
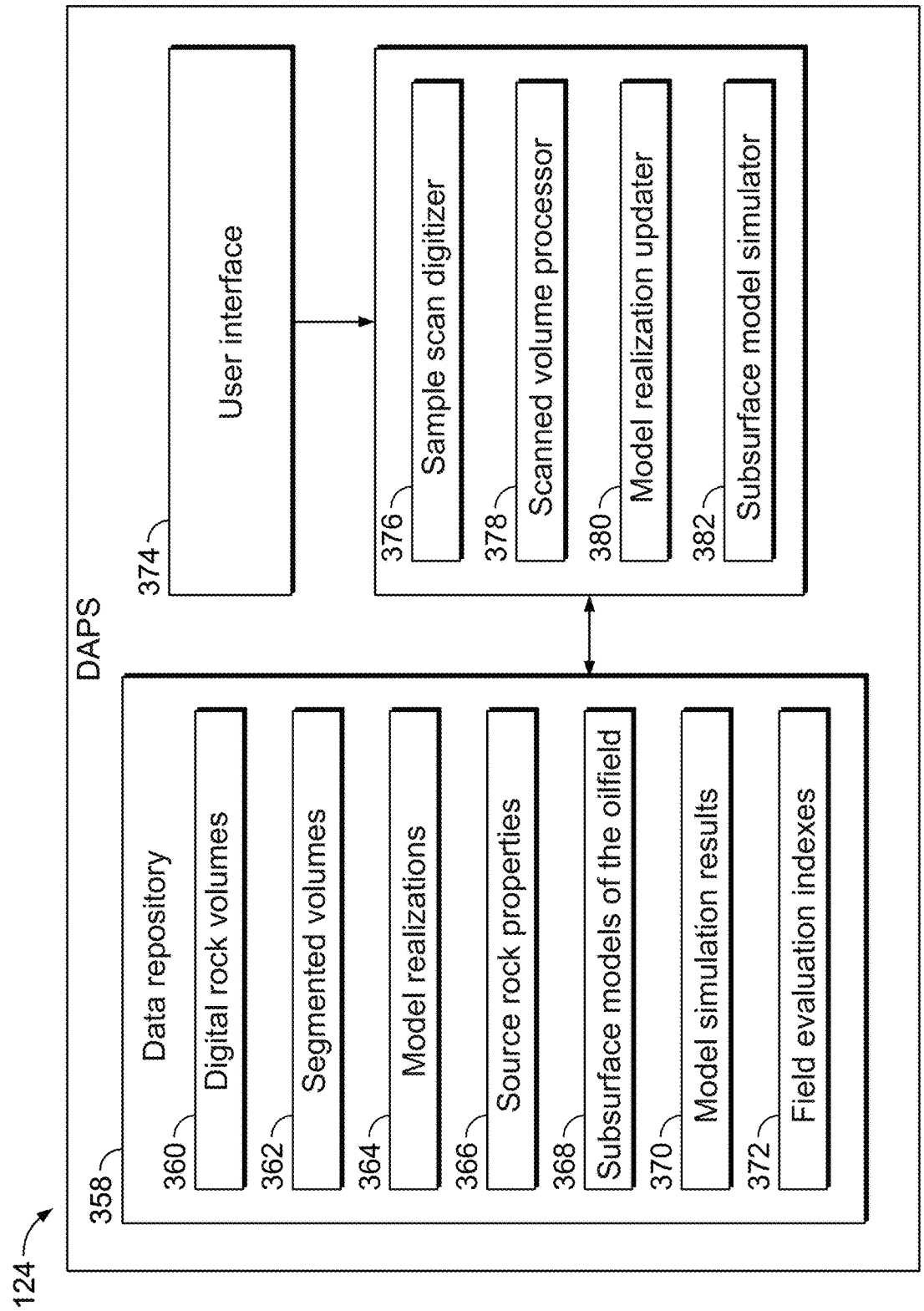
FIG. 10 is a block diagram of components within a data acquisition and processing system.

FIG. 10 presents a set of components implemented within the DAPS 124. A data repository 358 stores several types of data generated through the implementation of the method 200. The digital rock volume 360 represents the computer representation of the scanned rock samples at the voxel level. Each voxel of the digital rock volume is correlated with the signal intensity originating from a certain location within the source rock sample 102. The segmented volume 362 represents a spatial assemblage of zones with each zone having a certain characteristic as interpreted from the digital rock volumes 360. The zones are spatially consistent with the source rock sample 102 and are attempting to map certain properties within the source rock sample 102. A model realization 364 is a mathematical representation of a set of elements that are useful for source rock parameter detection. The model realization 364 is built based on the mapped characteristics present in the segmented volume 362 obtained from the CT-scan during a time step. A time step is the amount of time necessary for the CT-scan system to acquire a complete volume measurement. The source rock properties 366 store values associated with a plurality of source rock physical characteristics. For example, density, porosity, organic content, hydrocarbon yield potential, kinetic parameters, adsorption coefficients, etc. A subsurface model of the oilfield 368 is a computer representation of the geological characteristics of the subsurface across an oilfield. It includes the geometrical and physical characteristics of a subsurface environment based on field measurements and interpretation of the field measurements. The model simulation results 370 store values for physical characteristics of the oil field resulting from when the subsurface model was simulated according to a geological or engineering evolution scenario. The field evaluation indexes 372 are a set of business risk factors that characterize a potential hydrocarbon accumulation location within the oil field. A user interface 374 is a computer application that enables a user to interact with the processes of the DAPS 124. A sample scan digitizer 376 converts the radiation intensity signal coming from the micro-CT scan device into a digital intensity value applied to each voxel to create a digital rock volume 360. A digital rock volume 360 is obtained after complex algorithms are applied to the input signal to reproduce each voxel at its correct location within the volume. A scanned volume processor 378 maps various spatial properties within the digital rock volume 360 based on the attributes of voxels within the digital rock volume 360. The mapped zones are assembled by the scanned volume processor 378 to obtain a segmented volume 362. A model realization updater 380 reads the segmented volumes 362 sequentially and creates model realizations 364 for the time series of measurements. The model realization updater 380 applies a set of calculations on spatial and geometric characteristics of the mapped zones within each segmented volume 362 as well as calculations based on changes of the mapped zones within segmented volumes 362 generated for each time step in the time series. The subsurface model simulator 382 conducts simulations of the subsurface based on a specified geological or engineering evolution scenario.

Figure 11:
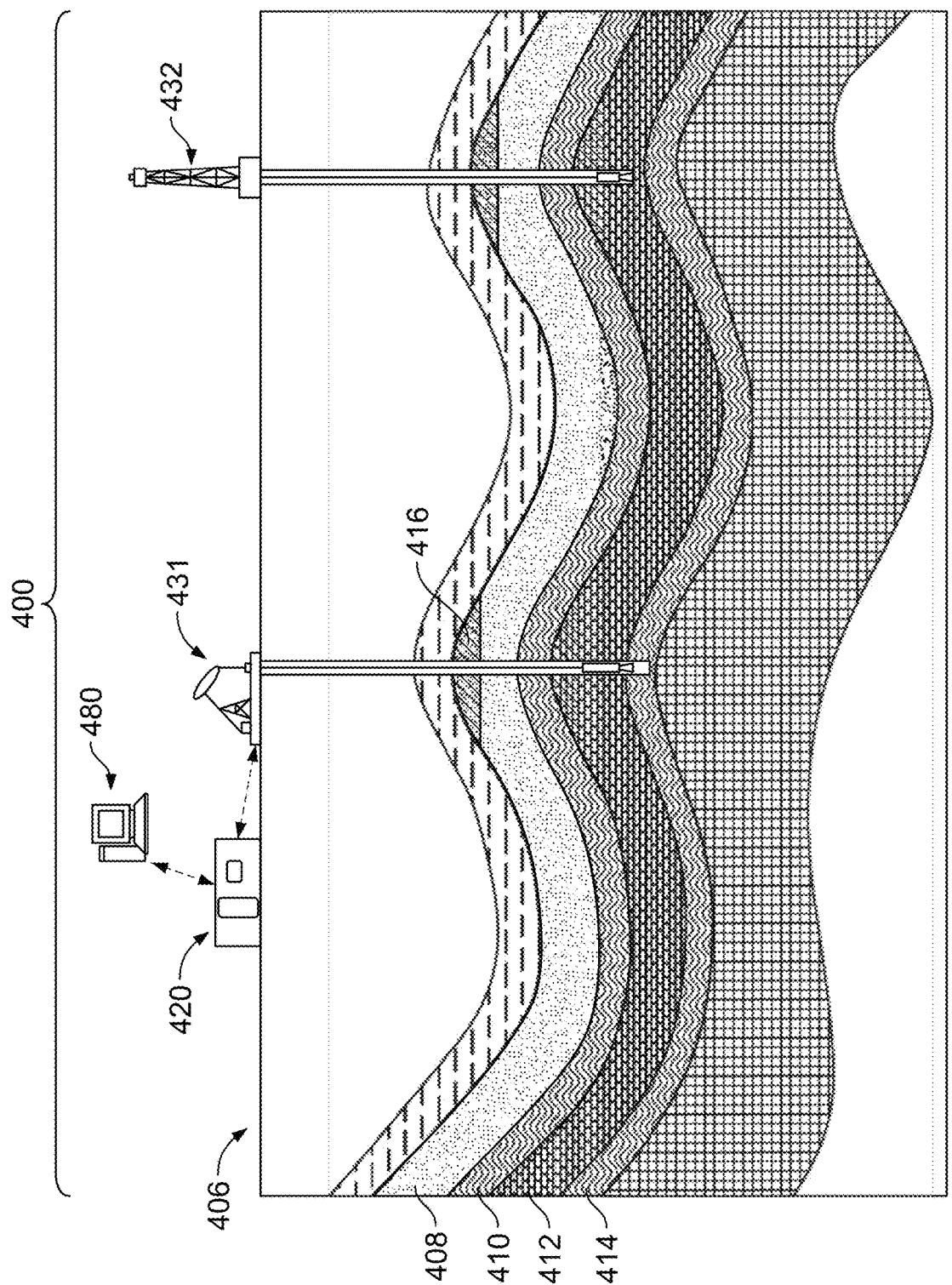
FIG. 11 is a schematic view of an oilfield where field operations are executed based on the evaluation index of the oilfield.

FIG. 11 is a schematic view, partially in cross-section, of an oil field 400 in which this approach to source rock evaluation based on time series analysis of digital rock models may be implemented. A geological sedimentary basin contains subterranean formations 406. As shown in FIG. 11, the subterranean formations 406 may include several geological structures. The formation may include a sandstone layer 408, a shale layer 410, a limestone layer 412, and another shale layer 414. In particular, the geologic sedimentary basin includes rock formations and at least one reservoir 416 including fluids. The surface unit 420 is communicatively coupled to the exploration and production (E&P) computer system 480. The E&P computer system may be the DAPS 124 computer system. In one or more embodiments, the data received by the surface unit 420 may be sent to the E&P computer system 480 for further analysis. Generally, the E&P computer system 480 is configured to analyze, model, control, optimize, or perform management tasks of the field operations based on the data provided from the surface unit 420. The E&P computer system 480 is provided with functionality for manipulating and analyzing the data, such as performing simulations, planning, or optimization of production operations of the wellsite system A 431 and/or wellsite system B 432. The results generated by the E&P computer system 480 may be displayed for an analyst user to view the results in a 2D display, 3D display, or other suitable displays. Although FIG. 11 shows a field 400 on land, the field 400 may be an offshore field. In such a scenario, the subterranean formation may be in the sea floor. Further, field data may be gathered from the field 400 that is an offshore field using a variety of offshore techniques for gathering field data.

Figure 12:
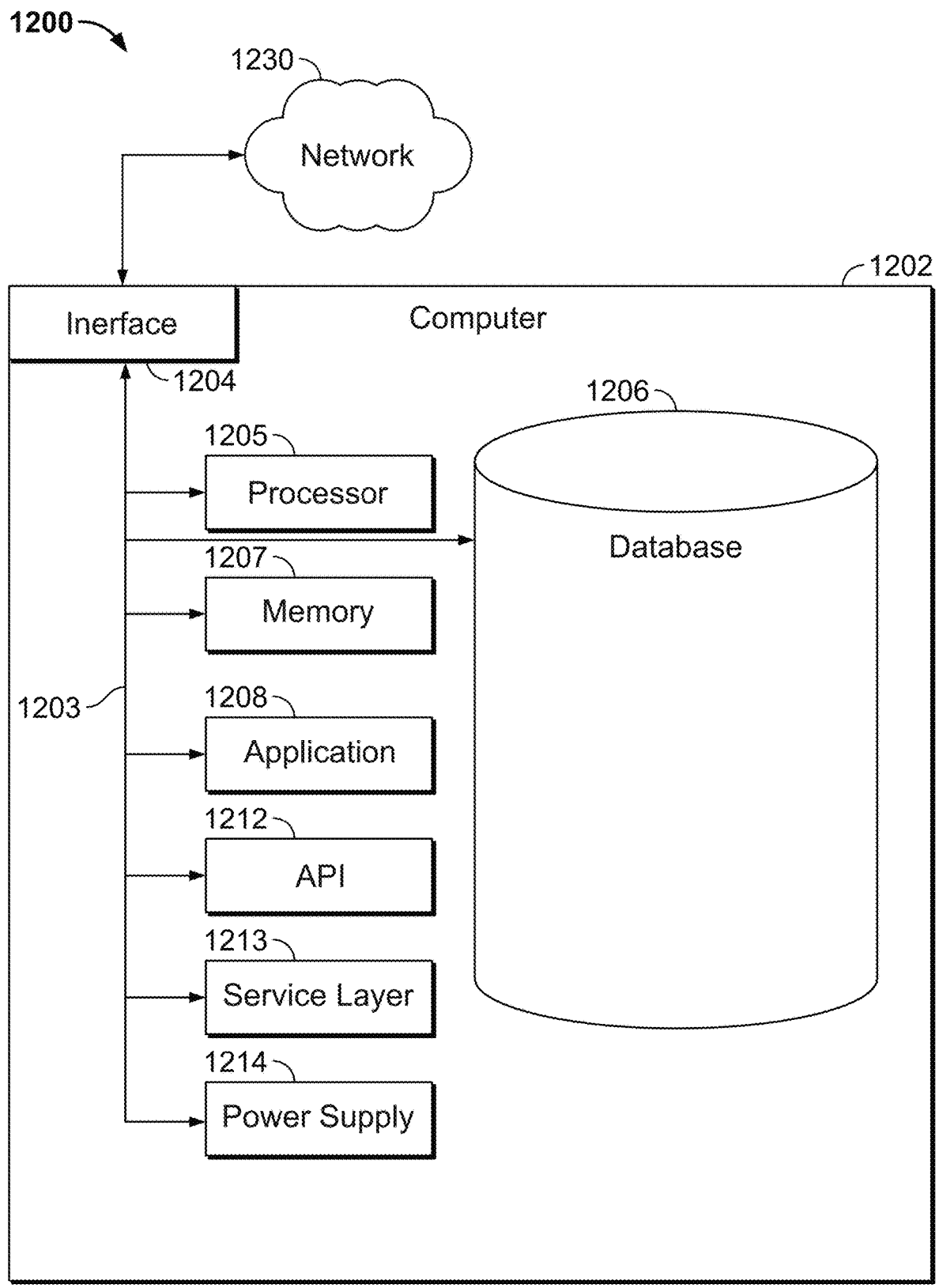
FIG. 12 is a block diagram illustrating an example computer system used to provide computational functionalities associated with described algorithms, methods, functions, processes, flows, and procedures according to some implementations of the present disclosure.

FIG. 12 is a block diagram of an example computer system 1200 used to provide computational functionalities associated with described algorithms, methods, functions, processes, flows, and procedures described in the present disclosure, according to some implementations of the present disclosure. The illustrated computer 1202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI).

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a high level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both), over the system bus 1203. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs.

The service layer 1213 can provide software services to the computer 1202 and other components (whether illustrated or not) that are communicably coupled to the computer 1202. The functionality of the computer 1202 can be accessible for all service consumers using this service layer. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 includes an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and can manipulate data to perform the operations of the computer 1202, including operations using algorithms, methods, functions, processes, flows, and procedures as described in the present disclosure.

The computer 1202 also includes a database 1206 that can hold data for the computer 1202 and other components connected to the network 1230 (whether illustrated or not). For example, database 1206 can be an in-memory, conventional, or a database storing data consistent with the present disclosure. In some implementations, database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

The application 1208 can be an algorithmic software engine providing functionality according to particular needs, desires, or particular implementations of the computer 1202 and the described functionality. For example, application 1208 can serve as one or more components, modules, or applications. Further, although illustrated as a single application 1208, the application 1208 can be implemented as multiple applications 1208 on the computer 1202. In addition, although illustrated as internal to the computer 1202, in alternative implementations, the application 1208 can be external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system containing computer 1202, with each computer 1202 communicating over network 1230. Further, the terms "client," "user," and other appropriate terminology can be used interchangeably, as appropriate, without departing from the scope of the present disclosure. Moreover, the present disclosure contemplates that many users can use one computer 1202 and one user can use multiple computers 1202.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks.

Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the invention have been described. Nevertheless, it will be understood that various modifications may be made without departing from the spirit and scope of the invention. For example, the actions recited in the claims can be performed in a different order and still achieve desirable results. As one example, some processes depicted in the accompanying figures do not necessarily require the particular order shown, or sequential order, to achieve desirable results. Accordingly, other embodiments are within the scope of the following claims.

What is claimed is:

1. A system for evaluating source rock, the system comprising:
    a reactor vessel comprising a body with an internal cavity sized to receive a sample holder, a heating system,
    a radiation source and a detector bracketing the reactor vessel, wherein the radiation source, the detector, and the reactor vessel are rotatable relative to each other; and
    a processor in communication with the detector, the processor causing performance of operations comprising:
    obtaining a plurality of measurements of a source rock sample;
    generating a conceptual model of the source rock sample based on the plurality of measurements obtained; and
    determining one or more properties of the source rock sample based on the conceptual model.

2. The system of claim 1, wherein the reactor vessel is fixed in position and the radiation source and the detector are rotatable around the reactor vessel.

3. The system of claim 1, wherein the operations further comprise assigning an evaluation index to an oil field based on one or more properties of the source rock sample.

4. The system of claim 3, wherein the operations further comprise determining the configuration of field equipment to be used in a hydrocarbon extraction based on the assigned evaluation index.

5. The system of claim 1, wherein the measurements of the source rock sample comprise a series of micro-CT scans.

6. The system of claim 5, wherein the operations further comprise applying an image segmentation algorithm to a volume of the micro-CT scans.

7. The system of claim 1, wherein the radiation source comprises an X-ray radiation source.

8. The system of claim 1, wherein the plurality of measurements is obtained during an artificial maturation experiment.

9. The system of claim 8, wherein the operations further comprise determining kinetic parameters of the source rock sample based on the plurality of measurements obtained.

10. A method for evaluating source rock, the method comprising:
obtaining a source rock sample from a subsurface formation;
disposing the source rock sample in a reactor vessel;
applying heat and pressure to the source rock sample in the reactor vessel to simulate maturation of the subsurface formation; and
while applying the heat and pressure, rotating a radiation source and a detector and the reactor vessel relative to each other to obtain a plurality of three-dimensional images of the source rock sample at different times.

11. The method of claim 10, wherein rotating a radiation source and a detector and the reactor vessel relative to each other comprises rotating the radiation source and the detector around the reactor vessel.

12. The method of claim 10, further comprising generating a conceptual model of the source rock sample based on the plurality of three-dimensional images of the source rock sample.

13. The method of claim 12, wherein the plurality of three-dimensional images of the source rock sample comprises a series of micro-CT scans.

14. The method of claim 13, further comprising applying an image segmentation algorithm to a volume of the micro-CT scans.

15. The method of claim 14, further comprising assigning an evaluation index to the subsurface formation based on one or more properties of the source rock sample.

16. The method of claim 14, further comprising determining kinetic parameters of the source rock sample based on the plurality of three-dimensional images of the source rock sample.

* * * * *